May 16, 1950 — E. P. McNAIR — 2,507,799
IMPLEMENT HITCH
Filed June 20, 1947
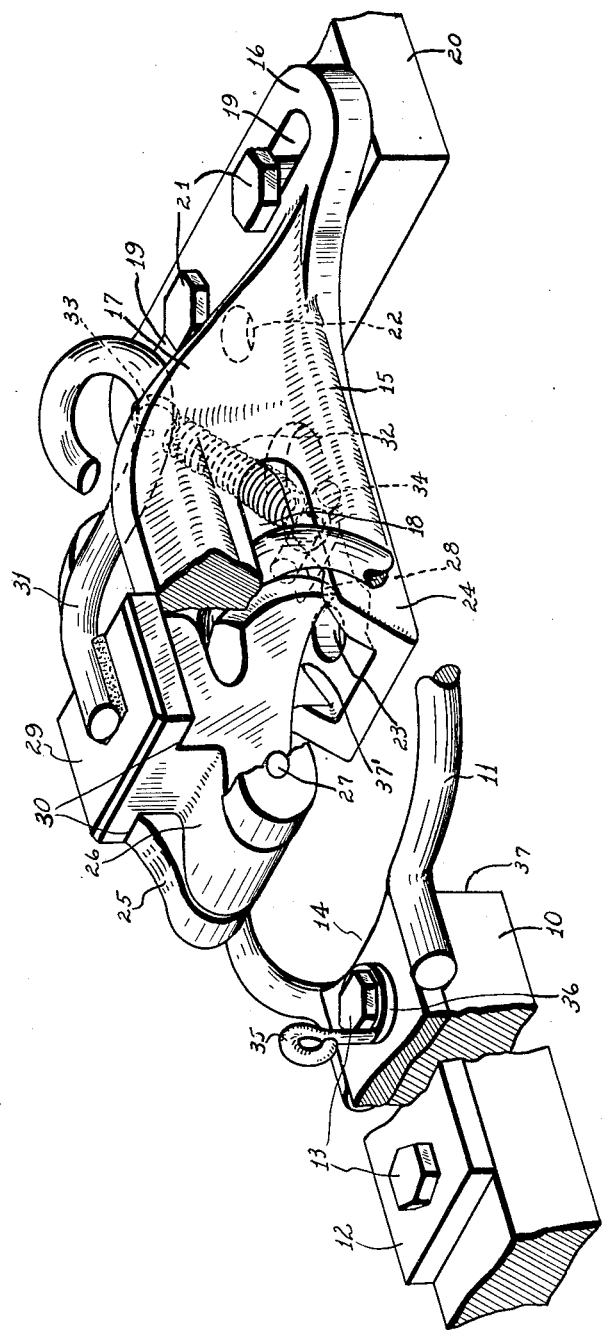
INVENTOR.
ERIC P. McNAIR
BY Benedict & Swartwood
ATTORNEYS

Patented May 16, 1950

2,507,799

UNITED STATES PATENT OFFICE 2,507,799

IMPLEMENT HITCH

Eric P. McNair, Mattoon, Ill., assignor of one-third to Wayne L. Benedict and Kenneth Swartwood, both of Danville, Ill.

Application June 20, 1947, Serial No. 755,837

6 Claims. (Cl. 280—33.15)

This invention relates to a hitch for attaching one vehicle to another. It specifically relates to a device for attaching an implement to a tractor, for example, a wagon to a farm tractor and the like. It also relates to devices such as a hitch for attaching a trailer to another vehicle such as a car.

While it is to be understood that the hitch has many other uses, it will be discussed herein primarily as a tractor hitch.

Many operations conducted around the farm are carried on by one man and it is inconvenient or impossible for him to obtain the assistance of others. The development of an apparatus whereby one man may work without assistance of others is a real aid to farmers. The present invention is of this character in that it permits one man to couple the implement to the tractor without getting off the tractor seat. One man may also uncouple the hitch and also it is not necessary for him to get off the tractor seat to uncouple the hitch. The main problem heretofore has been for one man to couple the hitch from the tractor seat. The tractor is usually backed toward a wagon tongue and some shifting of the position of the tractor either frontward or backward, or even sideways is required to get the tractor in proper position with relationship to the wagon tongue for coupling it. Therefore it is necessary that the hitch can be coupled from the tractor seat in order that the operator of the tractor can manipulate the tractor into coupling position. This can be done by use of my hitch. Once the hitch is coupled, the problem no longer exists in regard to the manipulation of the tractor, and it is a simple operation to uncouple the hitch without getting off the seat. Coupling the wagon to the tractor is the real problem, uncoupling is not. I have solved the coupling problem for one man operating the tractor from the seat.

It is therefore an object of my invention to provide a hitch that can be coupled from a tractor seat by the tractor driver.

It is also an object of this invention to provide a coupling which is automatic. That is, when the coupling is made there is no way possible for the hitch to become uncoupled without a positive operation by the operator. This is highly important since it does not permit the operator to forget to place into position a positive coupling, as is the case in many hitches on the market. If the operator forgot to put in position the positive coupling on hitches presently on the market, the wagon or other vehicle might become detached and if this occurred on the highway, serious injury to property and life might occur.

I also provide a hitch which is simple in design and economical to build.

It is a further object of my invention to provide a hitch in which there is substantially tight coupling which prevents chattering and "play."

It is a still further object of this invention to provide a hitch in which the more complicated and expensive portion attaches to the tractor draw bar and the less expensive and less complicated portion is attachable to the tongue of a wagon and the like. This is a big advantage to a farmer who has a number of vehicles to be pulled by a tractor since he need buy only one expensive part of the hitch which is attachable to the tractor and he can buy as many of the less expensive portions as needed for attaching to the wagon tongues. This is a distinct improvement in the automatic hitch art.

It is also an object of the invention to provide means for distributing the force exerted against the latch embodied in the tractor portion of the hitch in order to relieve a substantial portion of the load on the pivot point of the latch.

Other advantages and objects will become apparent by referring to the drawing.

The tongue of an implement such as a wagon is represented by the numeral 10. The loop member 11 is a portion which is attached to the tongue. The loop member 11 may be welded or fastened by suitable means to the plate 12 which is fastened to the wagon tongue by means of the bolts 13. It is preferable that the loop 11 be in a perfect circle in order to avoid all binding when the coupling is made, especially when turning the wagon or in coupling the wagon when the tongue is at an angle to the direction of movement of the tractor. For these reasons the front of the plate 12 is cut away to keep the circle at the point 14. It is also essential in order to prevent binding that the plate 12 extend beyond the end of the tongue 37.

The latch member adaptable to be fastened to the draw bar of a tractor is generally designated by the numeral 15. It comprises the adaptor plate 16 to which is attached the jaw-like portion 17 having the open jaw 18. The adaptor plate 16 has a pair of slotted openings 19 which makes the adaptor plate readily attachable to the draw bar 20 of the tractor. The slotted openings permit variations in the distance apart of the holes in the draw bar to permit attachment to a tractor draw bar of any size and type, with exception of the swinging type. The bolts 21 fasten the adaptor plate to the draw bar 20. In addition, holes 22 and 23 are provided in the adaptor plate to permit attachment to a swinging type of draw bar. In the swinging type of draw bar, a bar extending in alignment with the direction of movement of the tractor is pivotally attached to the draw bar 20 and in many instances farmers prefer to attach the hitch to the swinging draw bar. The inner sides of the lower side 24 are cut away as shown on the drawing to permit the bolt at 23 to drop in place.

The upper side 25 of the jaw extends over the lower side 24 to permit pivoting of the latch 26 about the pivot 27. It is desirable to have the latch 26 pivot about the axis 27 at a distance as far away as practical from the contact of the ring 11 with the latch 26 in order that the latch may readily be released when it is desired to uncouple the hitch. Such uncoupling is helped additionally by having the curvature of the latch at the point 28 substantially the same as the arc in which the latch is pivoted about the pivot 27. When it is desired to uncouple the hitch, very little slack need be obtained in having the wagon tongue move forward relative to the tractor to permit sufficient clearance by the ring 11 and the curved portion 28 of the latch 26 to permit the latch to be raised free of the ring. Once the latch is raised, uncoupling is accomplished by merely driving the tractor away from the wagon tongue, whereby the ring pulls out from the jaw and the wagon tongue falls to the ground.

An important feature of the invention is a provision of the shoulder 29 on the latch which forms a bearing surface at the corresponding bearing surface 30 on the top side of the upper side of the jaw 25. It has been found that substantially over 50% of the stress is distributed on the bearing surfaces 30 which relieves the stress on the pivot point 27, and avoids any possibility of the pivot 27 breaking due to undue stress.

A hook member 31 is attached to the shoulder 29 by means of welding or otherwise fastened, which permits the driver of the tractor to reach back with a hand-operated hook on the end of a pole and, provided sufficient clearance has been obtained as heretofore described, an upward movement permits the uncoupling of the hitch.

Ordinarily the weight of the latch 26 is sufficient to keep the latch closed, but the spring 32 attached to the hook 31 at the point 33 and to the pin 34 which is welded to the lower side of the jaw provides a positive means for always maintaining the latch in closed position. Such positive latching is essential particularly when a wagon is pulled over a highway to prevent traffic accidents due to uncoupling of the wagon.

A hook 35 attached by means of the washer portion 36 underneath the forward bolt 13 provides a means for the operator of the tractor to use a hand-operated hook for lifting the wagon tongue in the proper place prior to coupling. The operator for coupling merely passes the hand-operated hook through the hook 35 and holds the wagon tongue substantially opposite the jaw opening 18 and then backs the tractor into the loop member 11, which forces the latch upwardly, and as soon as the hook 11 passes the point 28 the latch automatically closes and the coupling is made. Once the coupling is made it cannot be uncoupled until the operator uncouples it by his own actions. The ring 11 is always pulling toward closed position of the latch, which is a distinct advantage of my invention.

It is also preferable to have the latch curve upwardly and inwardly at the point 37' in order that the loop member 11 readily slides into place during the coupling operation.

Thus I have described a hitch for coupling two vehicles which can be operated by one man from the tractor seat and which can be just as readily uncoupled. This is a distinct advantage over any hitch presently on the market. While I have described only one embodiment of my invention, other embodiments may be made without departing from the scope of the following claims.

I claim as my invention:

1. A tractor hitch of the character described comprising a base plate including an adapter for attaching said hitch to a tractor draw bar, two vertical members integral with said plate forming an open channel, a horizontal opening in said channel members forming an upper jaw and a lower jaw, said opening being adapted to receive a traction ring, the upper jaw being substantially longer than the lower jaw, pivot means mounted adjacent the terminal end of said upper jaw forwardly of the terminal and of said lower jaw, a latch member pivotally mounted on said pivot means within said channel, said latch comprising shoulders above said pivot means adapted to rest on said vertical members when the latch is in closed position, a bill on said latch extending downwardly and inwardly from said pivot means and into the channel of said lower jaw thereby blocking the opening between the jaws when the latch is closed leaving an opening between said latch and the point of juncture of the jaws, the outward portion of the jaws and the bill which normally lie across the jaws being adapted and shaped to guide a draft ring into the opening between said jaws, manual latch opening means, spring means normally urging the latch closed, said latch being positioned to open with an inward and upward motion and to be urged into closed position when a draft load is applied.

2. The hitch of claim 1 wherein the draft bearing face of the bill is curved downwardly, and then outwardly adjacent the tip, into said opening.

3. The hitch of claim 1 further characterized by stiffening ribs along the sides of said jaws.

4. The hitch of claim 1 wherein the manual opening means is an inwardly extending lever having a loop at one end, the other being attached to the top of said latch.

5. The hitch of claim 1 having a manual opening means resting partially within the channel formed by the sides of said body.

6. The hitch of claim 1 wherein the spring is a tension spring attached at one end to said manual opening means and at the other end to a point in said lower jaw.

ERIC P. McNAIR.

REFERENCES CITED

The following references are of record in the file of this patent:

UNITED STATES PATENTS

| Number | Name | Date |
| --- | --- | --- |
| 665,294 | Williams | Jan. 1, 1901 |
| 784,927 | Crisler | Mar. 14, 1905 |
| 827,431 | Evensen | July 31, 1906 |
| 967,713 | Blom | Aug. 16, 1910 |
| 2,002,658 | Elliot et al. | May 28, 1935 |
| 2,200,654 | Ruhl | May 14, 1940 |
| 2,221,492 | Sawyer | Nov. 20, 1940 |
| 2,429,761 | Ketel | Oct. 28, 1947 |

FOREIGN PATENTS

| Number | Country | Date |
| --- | --- | --- |
| 174,386 | Great Britain | Jan. 16, 1922 |
| 532,060 | Germany | Aug. 22, 1931 |